United States Patent [19]
Crosswhite

[11] 3,874,302
[45] Apr. 1, 1975

[54] CONVEYOR SYSTEM FOR WHEELED CARTS

[76] Inventor: Bert Crosswhite, 6641 S.E. Johnson Creek Blvd., Portland, Oreg. 97206

[22] Filed: Apr. 1, 1974

[21] Appl. No.: 456,740

[52] U.S. Cl............. 104/172 B, 104/170, 104/253, 198/168
[51] Int. Cl............................................. B61b 13/00
[58] Field of Search...... 104/172 R, 172 B, 172 BT, 104/172 C, 172 S, 170, 171, 253, 165; 198/168, 34

[56] References Cited
UNITED STATES PATENTS

| | | | |
|---|---|---|---|
| 382,043 | 5/1888 | Klinik et al. | 104/172 C |
| 724,040 | 3/1903 | Pusterla | 104/172 B X |
| 3,369,650 | 2/1968 | Caretto et al. | 198/34 X |
| 3,404,636 | 10/1968 | Kavieff | 104/172 S |

Primary Examiner—Lloyd L. King
Assistant Examiner—Randolph A. Reese
Attorney, Agent, or Firm—Kolisch, Hartwell, Dickinson & Stuart

[57] ABSTRACT

A conveyor system for wheeled carts, including an elongate conveyor for drawing carts along a path over a flat support surface with their front wheels raised off the surface, so that carts having casters at one or both ends are drawn in a straight line without the need for wheel guides or tracks along the path. The conveyor includes an endless chain trained around a sprocket at the upstream end of the conveyor and having an upper reach extending in the direction of the path, just below the support surface. Elongate, outwardly projecting pins are attached to the chain at spaced intervals therealong. As the pins move with the chain around the sprocket, they raise to engage a member on the bottom of a cart positioned with its front end adjacent and overlying the upstream end of the conveyor. The cart's front end is lifted as the pin is fully raised, and the cart is drawn along the path with its front wheels off the surface. At the conveyor's downstream end, the upper reach of the conveyor slopes downwardly with respect to the surface to lower the front wheels, then disengage the pin from the cart. Carts are fed individually to the upstream end of the conveyor by a downwardly sloping ramp having releasable cart stops.

10 Claims, 6 Drawing Figures

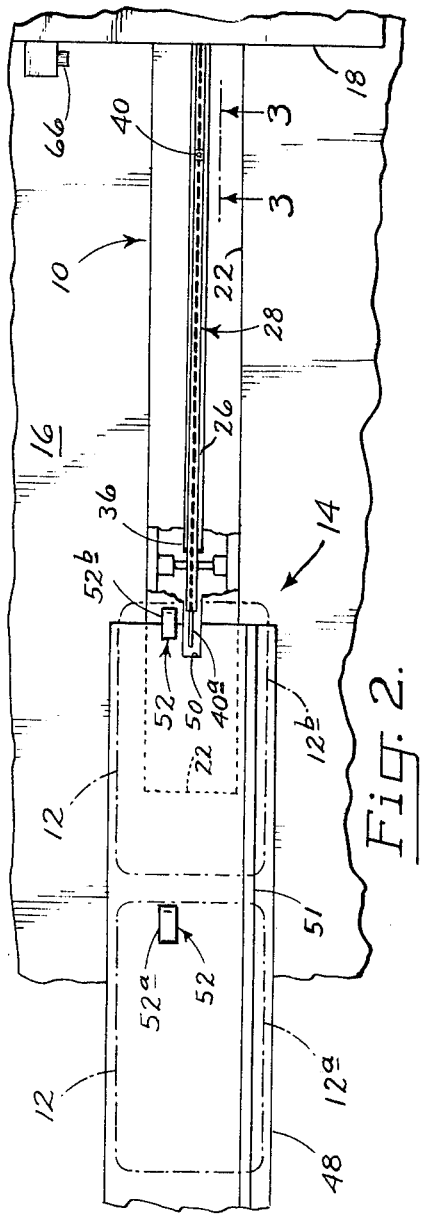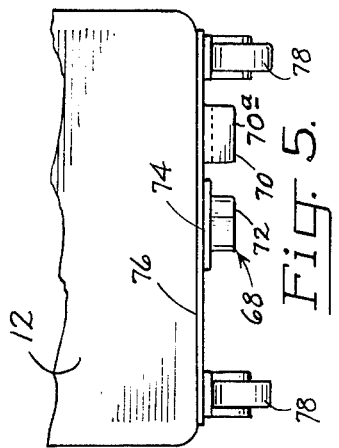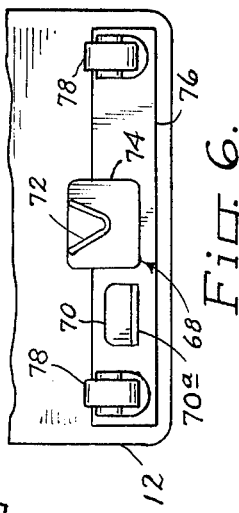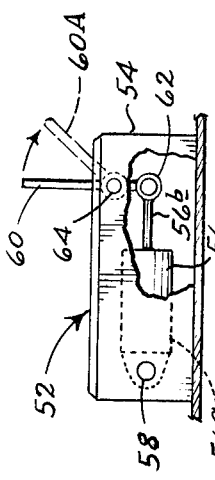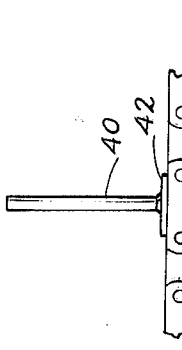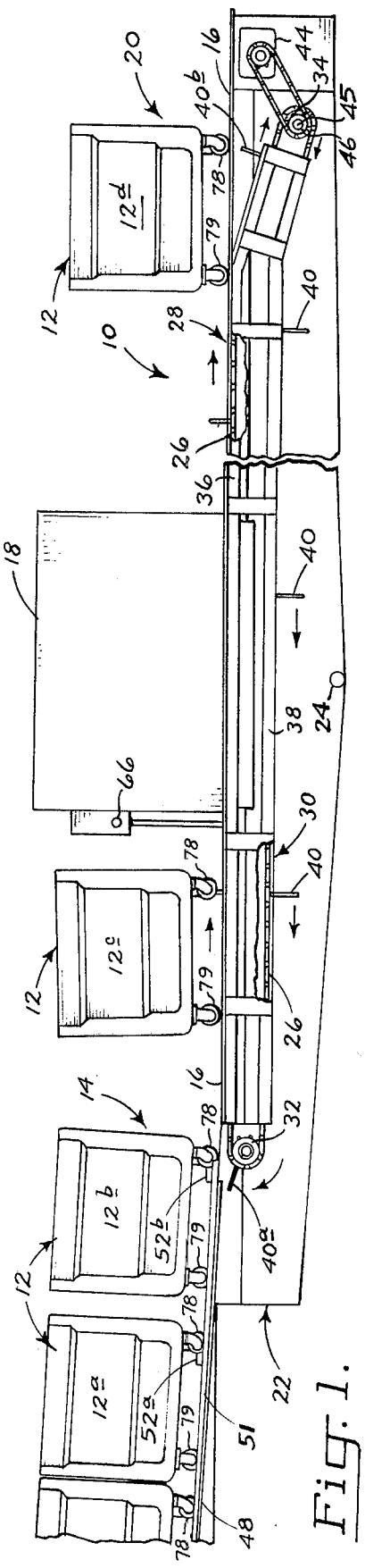

3,874,302

CONVEYOR SYSTEM FOR WHEELED CARTS

BACKGROUND OF THE INVENTION

The present invention concerns a conveyor system for wheeled carts, such as laundry carts and the like. More particularly, the invention concerns a system in which such carts are individually engaged at a conveyor loading station, drawn in spaced relation along a path over a substantially flat surface, and automatically released at a discharge station adjacent the downstream end of the conveyor.

Wheeled, cart-like containers are used in industry for a variety of purposes, including transporting clean and soiled laundry, delivering food or supplies, collecting and carrying waste material, etc. Periodically, such carts must be cleaned and sanitized, and for this the applicant herein has previously developed suitable automatic washing apparatus which is described in his U.S. Pat. No. 3,736,948, issued June 5, 1973. Using such apparatus, a cart-like container can be completely washed and dried in less than 5 minutes. However, where a large number of carts must be cleaned regularly, labor costs for loading and unloading the apparatus by hand can become quite significant. In order to minimuze such costs and maximize cleaning system efficiency, a need has developed for a conveyor system which can automatically pick up or engage individual carts from a group accumulated at a loading site, move them in spaced sequence along a path through the cleaning apparatus, and, finally, discharge the cleaned carts at a downstream unloading site.

One requirement of such a system is that it be adapted for conveying conventional wheeled carts which, for maneuverability, typically have swivel-mounted wheels at one or both ends. Moreover, it is desirable that the floor or support surface along the cart's path of travel be substantially flat and without wheel guide rails, grooves, etc. It is also desirable that any modifications needed to adapt carts for use with the system be relatively minor. Finally, it is desirable that the cart conveyor system be relatively simple in design, economical to construct and maintain, and that it not pose any unusual safety hazards to operating personnel.

Accordingly, a general object of the present invention is to provide a conveyor system for wheeled carts, such as laundry carts and the like, which is constructed to meet the above-identified needs in a practical and satisfactory manner.

This and other related objects of the invention are attained in the disclosed conveyor system which includes an elongate conveyor for moving wheeled carts along a path over a flat support surface. The exemplified conveyor includes an endless chain adapted for movement around a sprocket at the upstream end of the conveyor, and thereafter along a reach extending in the direction of the path, just below the support surface. Elongate, outwardly projecting pins are attached to the chain at spaced intervals along its length for engaging carts and drawing them along the path.

A downwardly sloping loading ramp adjacent the upstream end of the conveyor is provided with releasable stops for holding a queue of carts on the ramp, and for periodically releasing individual ones of them onto the conveyor. The stops are located so that the front end of the lead cart in the queue is positioned at a loading site overlying the sprocket at the conveyor's upstream end. Timing and control means are provided for automatically releasing the cart held at the loading site in timed relationship with movement of the conveyor chain, so that the cart is released as a pin on the chain swings upwardly around the sprocket and engages a receptacle located on the bottom of the cart, between its front wheels. Following engagement, and with further movement of the chain, the pin lifts the cart to raise its front wheels free of the support surface. In this position, the cart is drawn along the path and through the washing apparatus.

Adjacent its downstream end, the conveyor includes an inclined section which slopes downwardly with respect to the support surface, so that a pin carried on the conveyor chain gradually recedes below the support surface as it moves along that section. Thus, as a cart is drawn along the inclined section, it first is lowered to return its front wheels to the support surface, then is released from the conveyor as the pin recedes and disengages from the cart.

BRIEF DESCRIPTION OF THE DRAWINGS

Other features and advantages of the invention will become apparent as the following detailed description of a preferred embodiment of the invention is read in conjunction with the accompanying drawings, wherein:

FIG. 1 is a diagrammatic side view of a conveyor system for wheeled, container-type carts illustrated in conjunction with apparatus for washing carts;

FIG. 2 is a somewhat enlarged, fragmentary top plan view showing a portion of the upstream end of the FIG. 1 conveyor system;

FIG. 3 is an enlarged, fragmentary side view taken along the line 3—3 in FIG. 2 showing a portion of the conveyor chain including an upstanding pin attached thereto;

FIG. 4 is an enlarged side view of a releasable stop mechanism; and

FIGS. 5 and 6 are enlarged, fragmentary front and bottom views, respectively, of a cart adapted for use with the conveyor system of FIG. 1.

DESCRIPTION OF PREFERRED EMBODIMENT

Referring first to FIGS. 1 and 2 of the drawings a preferred embodiment of the invention is illustrated therein in the form of a conveyor system for transporting laundry carts or the like through apparatus for washing and sanitizing them. The exemplified system includes an elongate conveyor 10 adapted for engaging laundry carts 12 stationed at a loading site 14 adjacent its upstream end, moving them in spaced sequence along a support surface, or floor, 16 through a cart washer 18 to a discharge site 20 adjacent the downstream end of the conveyor.

Conveyor 10 is set in an elongate, open-top trough 22 in floor 16. As shown in FIG. 1, trough 22 has a sloping bottom, and is provided with a suitable drain means, indicated at 24.

Conveyor 10 includes an elongate, endless flexible chain 26 trained about and extending between suitable sprockets at the opposite ends of the conveyor. Thus, referring particularly to FIG. 1, chain 26 extends in upper and lower reaches 28, 30, respectively, between an idler sprocket 32 at the conveyor's upstream end, its left end in the figure, and a drive sprocket 34 at its downstream end. Conveyor chain 26 is guided and supported for travel along upper reach 28 by a chain guide 36, and along lower reach 30 by a guide 38. Chain guides 36, 38 comprise elongate channel-section members, or other equivalent construction suitable for the purpose of supporting and guiding the chain. It will be noted that over the major portion of its travel along upper reach 28, chain 26 is supported just below and substantially parallel to the surface level of floor 16. However, along a short stretch at discharge site 20 adjacent the downstream end of the conveyor, upper reach 28 slopes downwardly with respect to the surface of floor 16 at an angle of about 15°.

Now referring to FIGS. 1–3, elongate lugs or pins 40 are secured to chain 26 at suitable, fixed intervals along its length, with the spacing between adjacent pins being greater than the length of a cart 12. As shown in FIG. 3, each of the pins is suitably attached, as by welding, to a base plate 42 welded across one of the links of the conveyor chain.

Again referring to FIG. 1, means powering travel of the conveyor chain 26 in the direction indicated by the arrows is provided by an electric motor 44 suitably coupled to drive shaft 45 mounting drive sprocket 34 through a conventional slip clutch 46. With activation of motor 44, pins 40 are carried by the chain along lower reach 30 toward the upstream end of the conveyor in a downwardly projecting, lowered position. As chain 26 travels about idler sprocket 32, a pin, such as pin 40a, is swung upwardly from its lowered position to a substantially upright, raised position, projecting upwardly above the level of floor 16. In this upwardly projecting, raised position, pins 40 are carried along upper reach 28 toward the downstream end of the conveyor.

Conveyor 10 further includes braking means for conveyor chain 26, comprising a power-actuated brake (not shown) coupled to drive shaft 45. Any suitable shaft brake may be used; however, apparatus similar to that shown in FIG. 6 of previously mentioned U.S. Pat. No. 3,736,948, and described therein, has proven especially suitable.

Referring to FIGS. 1 and 2, cart infeed means for conveyor 10 includes an elongate ramp 48 extending upstream from the conveyor, and disposed in substantial alignment with it. Ramp 48 slopes downwardly at a shallow angle toward the conveyor and terminates at floor level adjacent and overlying its upstream end. To provide clearance for pins 40 as they swing upwardly around idler sprocket 32, a centrally disposed notch 50 (FIG. 2) is provided in the downstream end of the ramp. Ramp 48 also is provided with a wheel guide 51 to maintain carts 12 in alignment with the ramp, and with the conveyor. Guide 51 comprises an elongate channel member secured to and extending along the ramp's upper surface a suitable distance inwardly of one edge, as shown.

The infeed means for conveyor 10 further includes a pair of releasable cart-holding mechanisms, or stops, 52, suitably mounted along ramp 48 at longitudinally spaced-apart locations as shown in FIGS. 1 and 2. The stops are spaced apart a distance slightly greater than the length of a cart 12.

Referring to FIG. 4, each releasable stop 52 includes a double-acting hydraulic ram 56 disposed within a suitable housing 54. The ram's cylinder 56a is pivotally attached to the housing at 58. Piston rod 56b is pivotally connected to the lower end 62 of an elongate stop member, or blade, 60 mounted for rotation about the horizontal axis of a pivot pin 64. Ram 56 is of conventional design and includes the usual fluid inlet/outlets (not shown) adjacent either end of cylinder 56a. Fluid pressure from any suitable source (not shown) is fed to the opposite ends of the cylinder for selectively retracting or extending piston rod 56b. As should be apparent, retraction of rod 56b causes blade 60 to rotate clockwise, or to the right, in FIG. 4 about pin 64 from a normal, holding position, indicated in solid outline, to a tilted, released position, shown in phantom outline at 60A. Subsequent extension of rod 56b restores the blade to its upright, cart holding position.

Disposed intermediate the upstream and downstream ends of conveyor 10, along the path of cart travel over floor 16, is an automatic cart washer 18, suitably one of the type disclosed in the above-mentioned U.S. Pat. No. 3,736,948. Washer 18 includes closable openings (not shown) at either end. An electric eye 66 connected to suitable timing and control means (not shown) for the conveyor system is provided at the upstream end of the washer, functioning in part to control doors closing the openings and to initiate actuation of the conveyor chain brake.

Referring now to FIGS. 1, 5, and 6, laundry carts 12 have a pair of laterally spaced front wheels 78 adjacent the front end of the cart and a pair of laterally spaced rear wheels 79 adjacent the rear end of the cart. A cart is adapted for use with the conveyor system of the invention by the provision of a pin receptacle 68 and a stop plate 70 mounted adjacent the forward end of the cart intermediate its front wheels. Pin receptacle 68 comprises a V-shaped member 72 joined on edge to a base plate 74. Plate 74 is secured, as by welding, to an elongate strip 76 mounting the cart's front wheels 78. As shown receptacle 68 is positioned centrally between the front wheels with the legs of member 72 diverging on extending toward the rear of the cart. Stop plate 70 is a short section of angle iron secured to mounting strip 76 intermediate receptacle 68 and a front wheel 78, and includes a downwardly projecting leg 70a.

Describing now the operation of the conveyor system, and referring to FIGS. 1 and 2, laundry carts needing cleaning are loaded onto ramp 48 at its upstream end (not shown). The carts are disposed in queue on the ramp with their near side wheels 78, 79 (FIG. 1) in guide 51, and with their front ends facing downstream. As the carts roll down the inclined ramp, they are stopped at the position shown for cart 12a by releasable stop 52a, the blade of which engages the cart's stop plate 70. Upon command from the timing and control system, ram 56 of stop 52a is activated to move blade 60 briefly to its release position 60A, which allows the cart to roll forward. After a short period, ram 56 returns blade 60 to its normal, upright position to stop the next succeeding cart and hold it at the cart 12a position. After being released by stop 52a, the cart rolls down the ramp to loading site 14 where it is stopped by releasable stop 52b at the position shown for cart 12b. As shown, the cart is disposed at the loading site with its front end adjacent and overlying the upstream end of the conveyor.

As described previously, upon activation of drive motor 44, pins 40 travel along the lower reach of the conveyor in a lowered position, swing upwardly around sprocket 32 and move into a raised position wherein they project upwardly above the surface of floor 16. It will be understood that pin receptacle 68 on a cart positioned at the loading site will be engaged by a pin, such as pin 40a, as it swings upwardly around the idler sprocket. Thus, as pin 40a approaches receptacle 68 on cart 12b, stop 52b is activated to release the cart. Following initial engagement of pin 40a with the receptacle, continued movement of the pin around sprocket 32 and onto the upper reach of the conveyor raises the cart's front end and lifts its front wheels off of floor 16. In this position, illustrated by cart 12c, the cart is drawn along a path overlying the conveyor with its rear wheels riding on floor 16 and its front end supported by the conveyor pin 40. Pins 40 suitably are of sufficient length to maintain the cart's front wheels about ½ to ¾ inch above the surface of the floor.

After a cart released by stop 52b has been engaged by a pin and carried past loading site 14 blade 60 of stop is returned to its upright position. Stop 52a is then activated to release another cart, which rolls down to the loading site and is stopped there by stop 52b. After it has been picked up by a subsequent pin 40, the process is repeated.

Carts drawn along conveyor 10 by chain 26 are carried past electric eye 66 and into cart washer 18. Signals fed to the timing and control system by the electric eye start a control sequence comprising braking conveyor chain 26 when the cart is correctly positioned inside the washer, closing the washer's doors and initiating the washing cycle. Motor 44 is stopped during the washing cycle, which typically lasts two to three minutes. However, slip clutch 46 provides a safety factor, preventing damage to motor 44 when chain 26 is stopped by its brake, or by accidental jamming.

Following washing of the cart, the brake is released, the washer's doors are opened, and the conveyor is restarted to carry the cleaned cart out of the washer and toward the downstream end of the conveyor. As previously described, upper reach 28 of the conveyor slopes downwardly away from the surface of floor 16 over a short stretch adjacent the conveyor's downstream end. With movement of the conveyor chain along this stretch, which comprises discharge site 20, a pin carried on the chain gradually decreases in height with respect to the floor surface. As will be appreciated, a cart carried on the pin will first be lowered, placing its front wheels back on floor 16, then released as the pin moves along this stretch. Cart 12d is shown at site 20 following disengagement from pin 40b. After all of the carts on the loading ramp have been cleaned, the conveyor is shut off automatically by the timing and control system.

There is thus provided a conveyor system for carts, such as laundry carts or the like, which meets the requirements set out above. Carts in queue on a loading ramp are individually released onto the conveyor, and carried along the conveyor with their front wheels supported above the surface of the floor. This allows carts having casters at one or both ends to be drawn along in a straight line, and eliminates the need to provide tracks or other wheel guide devices along the cart's path of travel. Following washing, the carts are automatically released from the conveyor along a downward sloping section comprising a discharge site adjacent the conveyor's downstream end. As the carts move along the sloping section they are gradually set down on all four wheels and then released. Since the conveyor pins recede gradually below floor level, the risk of injury to an operator's feet is substantially eliminated.

Although a preferred embodiment has been described herein, it is understood that variations and modifications are possible without departing from the spirit of the invention. For example, the conveyor could be operated continually, rather than intermittently in other applications or with other forms of cart washing apparatus.

It is claimed and desired to secure by Letters Patent:

1. Apparatus for moving carts having front and rear wheels in one direction along a path over an elongate, substantially planar support surface with the front wheels of the cart leading the rear wheels, said apparatus comprising an elongate conveyor disposed adjacent said surface and extending in the direction of said path, said conveyor including means for engaging and lifting the front end of such a cart comprising an elongate lug shiftable between a raised position projecting above said surface a distance sufficient to engage and lift the front end of a cart and raise its front wheels above said support surface and a lowered position spaced therebelow, and means for drawing the cart along said path with its rear wheels on said surface comprising drive means operatively connected to said lug for moving the same under power along said path when the lug is in its raised position.

2. The apparatus of claim 1, further comprising infeed means for positioning a cart adjacent the upstream end of the conveyor for engagement by said engaging means.

3. The apparatus of claim 1, wherein said conveyor comprises an elongate, endless, flexible member having an upper reach extending adjacent said surface, said elongate lug is secured to and projects outwardly from said flexible member, and said drive means includes means powering movement of the member whereby said upper reach is moved in one direction along said path.

4. The apparatus of claim 3, wherein said flexible member includes upper and lower reaches, with upper reach extending adjacent said surface, and said conveyor further comprises a rotatable element disposed adjacent the upstream end of the conveyor, about which said member is trained, and means for powering movement of said member about the rotatable element, such movement being effective to carry a lug thereon from a lowered position below to a surface to raised position projecting above said surface for engagement with the front end of a cart suitably positioned with its front end adjacent and overlying the upstream end of the conveyor, and thereafter to lift the front end and draw the cart along said path in said one direction.

5. The apparatus of claim 4, wherein a portion of said upper reach adjacent the conveyor's downstream end extends downwardly at an angle with respect to said surface to effect disengagement of a lug from a cart being drawn along said path as the cart approaches said downstream end.

6. The apparatus of claim 4, further comprising infeed means for positioning a cart with its front end adjacent and overlying the upstream end of the conveyor whereby a lug on said flexible member will engage said front end upon movement of the lug from its lowered to its raised position as it moves said lower reach about said rotatable element to said upper reach.

7. The apparatus of claim 6, wherein said infeed means comprises an elongate ramp for holding a supply of carts, said ramp sloping downwardly toward the upstream end of the conveyor and releasable stop means for sequentially positioning individual ones of said carts with their front ends adjacent and overlying said upstream end of the conveyor.

8. Apparatus for moving a cart having front and rear wheels in one direction along a path over an elongate support surface with its front wheels leading its rear wheels, said apparatus comprising an elongate conveyor having a reach extending substantially parallel to said path, an engaging element secured to a cart adjacent its front end, means on said conveyor for engaging the cart and lifting its front wheels above said surface with the rear wheels of the cart remaining on said surface, said engaging and lifting means comprising an elongate lug shiftable between a raised position projecting above said surface a distance sufficient to engage said element on the cart and lift the front end of the cart from said surface, and a lowered position spaced therebelow, and drive means for moving said conveyor and engaging and lifting means in the direction of said path.

9. The apparatus of claim 8, wherein said conveyor comprises an elongate, endless, flexible conveyor member, means supporting said conveyor member with an elongate upper reach thereof extending substantially parallel to said surface in the direction of said path and a lower reach spaced below said upper reach, said support means including a training element adjacent the upstream end of said conveyor about which said conveyor member is trained in reverse bend between said upper and lower reaches, and said elongate lug is secured to said conveyor member for movement therewith, said lug on moving with the conveyor member about said training member being moved from said lowered position to said raised position.

10. The apparatus of claim 9, wherein a downstream end portion of said upper reach of the conveyor member inclines downwardly at a shallow angle from said surface on progressing in a downstream direction relative to said path to effect lowering of the front wheels of a cart onto said surface and disengagement of said lug from the cart.

* * * * *